July 2, 1935.  B. THAL  2,006,525
GRIP LOCK
Filed Oct. 30, 1931
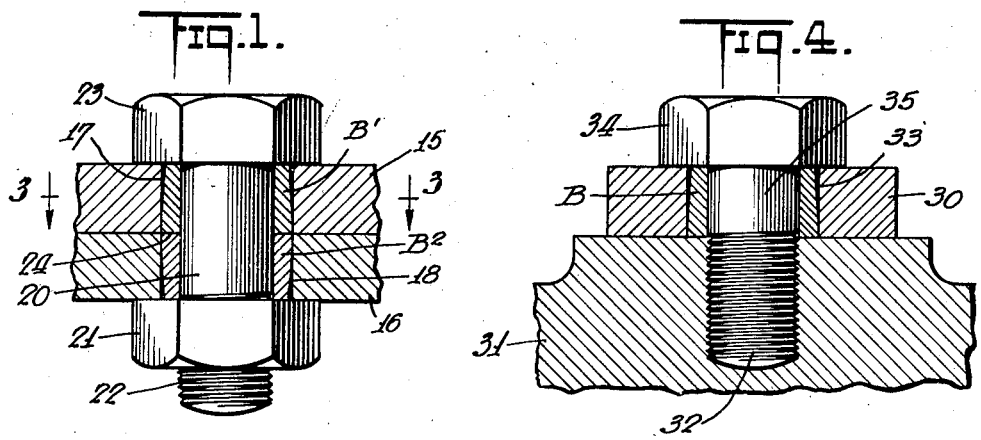
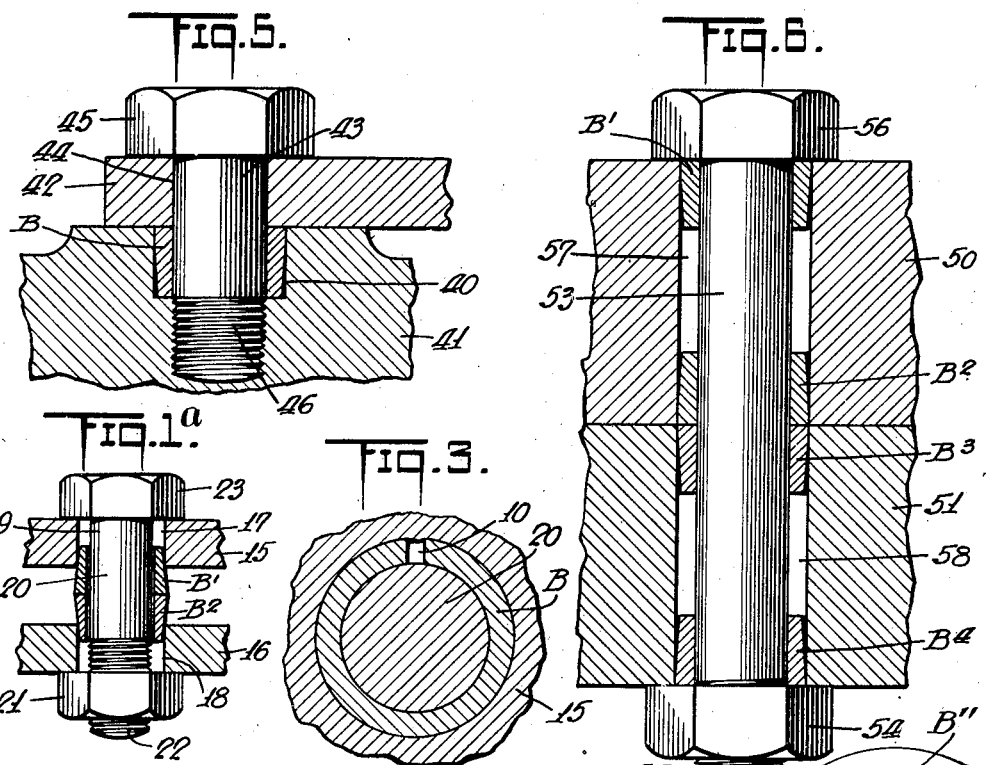
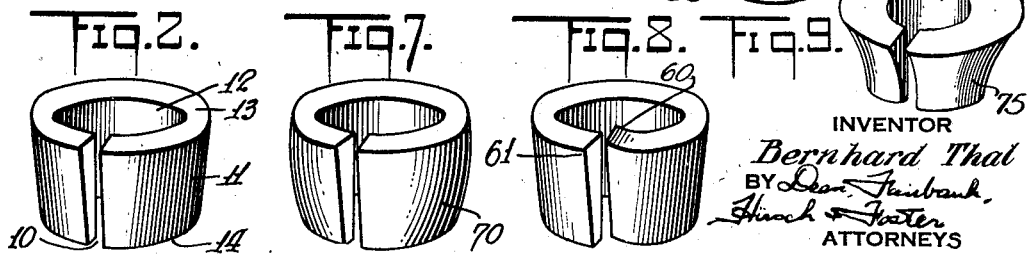
INVENTOR
Bernhard Thal
BY
ATTORNEYS Patented July 2, 1935

2,006,525

UNITED STATES PATENT OFFICE 2,006,525

GRIP LOCK

Bernhard Thal, Jamaica, N. Y., assignor of one-half to David Goldman, Dorchester, Boston, Mass.

Application October 30, 1931, Serial No. 571,963

13 Claims. (Cl. 85—1)

My present invention while primarily concerned with bolt locks, is of wider applicability to the locking of studs, pins, rods, bolts or screws to extend from or through one or more metal plates or structures.

An object of the invention is to securely mount a stud, pin, rod, bolt or screw with respect to a metal plate, without the need for precision in the size of mounting hole relative to the diameter of pin or bolt shank, without necessity for the added thickness of a lock washer, and yet with definite assurance that the pin or bolt will be firmly affixed without the slightest looseness or play.

Another object is to provide a metallic fastener for connecting two or more relatively heavy metal parts in permanent relation, which may be applied by the use of an ordinary wrench, to attain substantially the security of a rivet, with the avoidance of the mechanical shock on the parts and the noise involved in a riveting operation.

Another object is to provide a metallic fastener for connecting a plurality of metal plates, structures or arms in associated relation, with freedom of pivotal movement of one or more of said elements as desired.

Another object is to provide a simple lock bushing construction of universal applicability to any of a wide variety of uses of the character set forth, among others for the mounting of a dowel pin into a plate, for the affixing of a pin serving as a pivot for an element in rocking or revolving relation in respect thereto and for the firm connection of two plates or any of a variety of other metal objects, as for instance, a plate and the casing of an apparatus, in secure, rigid metallic contact.

A general feature of the invention is the use of a steel bushing tapered at its outer face, and longitudinally split or otherwise rendered resilient.

This bushing in various applications is inserted into a hole through a metal plate or other mounting structure, of diameter ordinarily intermediate between those of the larger and smaller end of the tapered bushing.

The pin, bolt or screw shank extends through the bushing, and the latter is forced into the hole, resulting in a wedging action and thereby frictionally engaging the wall of the hole substantially throughout the length and periphery of the bushing and frictionally embracing the shank of the pin, screw or bolt throughout the length and periphery of the inner wall of the bushing.

Where the pin element is a headed screw threaded into a metallic mount, or where this element is a bolt with a nut threaded on one end thereof, the tightening of the screw or the tightening of the nut would serve as the instrumentality for wedging the tapered bushing into position to frictionally grip the shank of the screw or bolt, and to frictionally engage the wall of the hole or bore mounting the bushing.

Where the plate or plates or other element to be affixed are of thickness considerably greater than the diameter of the bolt, the bushings need not extend the entire thickness of the metal but it is sufficient for them to extend flush with the respective surfaces of the plate and they serve to space the shank from the hole at that portion of the thickness between the tapered bushings which extend inward from opposite faces of the plate.

In the accompanying drawing, in which are shown one or more of various possible embodiments of the several features of the invention, Fig. 1 is a view in longitudinal cross section showing a bolt connection between two plates;

Fig. 1a is a view similar to Fig. 1, showing the bolt in the process of being applied;

Fig. 2 is a perspective view of the tapered bushing;

Fig. 3 is a cross sectional view taken on line 3—3 of Fig. 1;

Fig. 4 is a view similar to Fig. 1 showing a screw connection between a plate and the mounting structure;

Fig. 5 is a view similar to Fig. 2 showing a screw pivot connection between two elements;

Fig. 6 is a view similar to Fig. 1 showing the application of the idea to the connection of thick or heavy plates;

Figs. 7, 8 and 9 are views similar to Fig. 2 of modifications.

Referring now to Figs. 1 to 3 of the drawing, there is shown in Fig. 2 particularly, a hardened steel bushing which in the preferred embodiment is longitudinally split at 10 and is tapered from end to end, presenting preferably a conical exterior 11 and a nearly cylindrical interior 12, an enlarged end 13 and a reduced end 14.

One application of the bushing is shown in Fig. 1 in its application to a bolt lock between two metal plates 15 and 16. These plates are drilled with apertures 17 and 18 respectively of diameter less than that of the larger bushing end 13 and greater than that of the smaller bushing end 14.

The smaller ends of the bushings B' and B² are readily inserted by hand into the respective holes 17 and 18 whereupon the two plates are superposed preferably with the larger ends 13 of the bushings in contact with each other. The bolt 19 is readily inserted through the bushings, its shank 20 extending loosely through the openings of the bushings, all as best shown in Fig. 1a. In tightening the usual nut 21 upon the bolt, clamping pressure is exerted between the head 23 and the nut 21 against the two plates, which action serves to force the apertures 17 and 18 of the respective two plates toward the larger ends 13 of the respective bushings. Thus, a wedging action results in which the bushings are brought flush with the respective plates, with their larger ends abutting at 24 in the plane of contact of the two plates 15 and 16. By this wedging action the clearance in the slots 10 of the respective bushings is partly or wholly taken up and the bushings snugly embrace the corresponding length of the bolt shank.

The resulting bolt lock though devoid of the conventional lock washer, affords a union of enhanced security in which the bolt shank is firmly gripped throughout the length and periphery thereof, and the bushings are firmly expanded against the walls 17 and 18 of the plates. The security of the connection is superior to that of a construction involving an ordinary lock washer, and the extra thickness incurred in the use of a lock washer is avoided. The connection is wholly devoid of play or looseness, and yet avoids the need for drilling the plates to precisely the diameter of the bolt shank.

In Fig. 4 is shown an application of the invention for securing a plate or other metal piece 30 to a thick or substantial mounting structure 31. For this purpose a screw rather than a bolt is used. The shank 35 of this screw is passed through bushing B in plate 30, with the larger end of said bushing toward structure 31, and the threaded end 32 is screwed into a corresponding hole. Obviously, in turning the screw by its head 34, the plate 30 is forced toward the larger and lower end of the bushing B until the plate has been forced flush with said large end. The same action of the bushing with respect to the hole and the screw shank occurs in this embodiment as in the embodiment of Fig. 1.

The embodiment of Fig. 5 generally resembles that of Fig. 4 except that in this case the bushing B is inserted at its smaller end into a counterbore 40 in the mounting structure 41. The shank 43 of the bolt extends through a corresponding aperture 44 in the arm 42, the head of the bolt 45 presses against said arm and the threaded end 46 of the bolt is screwed into the mount 41. As a consequence the pressure exerted against bar 42 forces the larger end of the bushing B into the counterbore 40 until the extremity comes flush with the outer face of the counterbore, thus locking the bushing into the counterbore and about the bolt shank. By backing off the bolt slightly, the security of its mount with respect to the bushing and the carrying structure 41 is maintained, but the clamping pressure on the arm 42 is relieved, so that the latter is now free to turn or be rocked about the pivot shank. Thus, a simple and secure pivot mount construction is provided.

The embodiment of Fig. 6 generally resembles that of Fig. 1 except that in this instance the plates 50 and 51 are shown of thickness in the order of from one to several inches, that is, considerably greater than the diameter of the bolt.

Since the locking effectiveness of a bushing reaches a maximum when the clamping length of the bushing is equal to the diameter of the bolt shank, it is possible to use the standardized bushings of Fig. 2 even for this purpose with substantially the same effectiveness as in the embodiment of Fig. 1. In this case such bushings B', B—2, B—3 and B—4 respectively are inserted with their smaller ends first from the opposite faces of the respective plates in drilled holes 57 and 58 of the same diameter as specified in the description of Fig. 1. The long shank 53 of the bolt extends through these elements. When the nut 54 is tightened about the threaded extremity 55 of the bolt, clamping pressure is exerted between said nut and the head 56 of the bolt, with the consequence that all four of the bushings B', B², B³ and B⁴ are forced inward into the respective bores, until the entire lengths of said bushings are within the respective thicknesses of the metal plates. In this relation bushings B—2 and B—3 will abut with their larger ends in the plane of contact between plates 50 and 51.

Clearly in this relation the bolt shank is securely gripped both at the nut and head ends of the bolt, and at the intermediate length thereof, thereby effecting a secure hold.

In the tightening action of the tapered bushing in each of the applications set forth, it will be apparent that the jamming or wedging of the larger end into the corresponding aperture tends to cause the metal of the latter to be forced into the space left by the smaller end of the bushing, which contributes to the effectiveness of frictional engagement between the bushing, its mounting hole and the shank respectively, throughout substantially the entire length of the bushing. It is within the scope of the invention, however, to render the outer surface of the bushing convex as best shown at 70 in Fig. 7 to afford additional metal for assuring snugness of engagement between the bushing, the mounting hole and the shank of the pin, bolt, rod or screw throughout the length of the bushing.

In Fig. 8 is shown an embodiment of bushing generally similar to that of Fig. 2 except that the slotted ends are brought out of alignment with respect to each other, so that the end 60 protrudes upward beyond the end 61. This construction is applicable in various relations set forth and has the advantage that in the wedging action the protruding tongue 60 will engage and bite into the nut or into the head of the bolt or screw to some extent, supplementing the gripping action of the bushing proper by a lock washer action.

Referring to Fig. 9, the bushing B¹¹ is generally similar to that of Fig. 2 except that its outer face is concave as at 75, and its depth is less than the thickness of the plates, to afford a gap between the adjacent reduced ends of the bushings. In this relation the large outer end of each bushing contacts respectively the head 23' of the bolt and the nut 21', affording a larger engaging surface than in the other embodiments, and in the wedging action the enlarged end of the bushing accommodates itself to the enlarged part of the bore. An effective jam fit is thus provided at the outer or exposed faces of the plates.

Thus, my invention provides an inexpensive and thoroughly effective instrumentality by means of which a stud, pin, bolt, rod or screw can be positioned with respect to one or more metal plates or structures for connecting them together. The operation of locking the stud, pin, rod, bolt or screw in position is simple, yet the security of the lock is superior in affording a peripheral clasping action about the shank of the stud, pin, rod, bolt or screw and the invention accomplishes this result although no great precision is exercised in the boring of the hole lodging the bolt, screw or other member. For convenience, it is generally preferred to make the hole in the plate of diameter 1/16 inch larger than that of the bolt so that drills of standard dimensions will serve to bore the apertures. The wall of the bushing would thus have a mean thickness of 1/32 inch.

The invention by the use of a single universal split steel bushing, which can be made of any of various diameters, affords the possibility of locking the shank of the stud, pin, or bolt with respect to any of a plurality of structures or plates through which such member extends, and at the same time affords the possibility of leaving one or more of the elements through which the member extends loose for freedom of pivotal movement thereof.

It will thus be seen that there is herein described apparatus in which the several features of this invention are embodied, and which apparatus in its action attains the various objects of the invention, and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:—

1. A bolt lock construction comprising a pair of contacting metal plates, a bolt therethrough of diameter materially smaller than the corresponding aperture of one of said plates, a split tapered steel bushing in said aperture and about the shank of the bolt, said bushing wedged into said aperture and about the shank of the bolt with the inner surface of said bushing making contact with the shank and the outer surface making contact with the aperture over a material portion of the length of the latter, and the larger end of said bushing substantially flush with the contacting faces of said plates.

2. A bolt lock construction comprising a pair of metal plates, a bolt therethrough of diameter materially smaller than the corresponding apertures in said plates, split tapered steel bushings in the holes of the respective plates and about the shank of the bolt, said bushings wedged into the holes of the respective plates and about the shank of the bolt, with their inner surfaces making contact with the shank and their outer surfaces making contact with said holes over a material portion of their length, the larger ends of said bushings being substantially in face to face contact with each other substantially in the plane of contact of the plates.

3. A bolt lock construction comprising a pair of metal plates, a bolt therethrough of diameter materially smaller than the corresponding apertures in said plates, split tapered steel bushings in the holes of the respective plates and about the shank of the bolt, said bushings wedged into the holes of the respective plates and about the shank of the bolt with their inner surfaces engaging the shank and their outer surfaces engaging the hole over a material portion of their length, the larger ends of said bushings being substantially in face to face contact with each other, the nut upon said bolt in exerting pressure to draw the two plates together effecting the wedging lock between the plates and the bushings for tightly gripping the shank of the bolt.

4. A bolt lock comprising a pair of metal plates having aligned cylindrical apertures therein, split tapered metal bushings inserted into said openings and having their larger ends abutting, a bolt extending through said bushings having a head against one of said plates and a nut against the other of said plates, said bolt in tightened position retaining said plates with their contacting faces in the plane of contact of the abutting ends of said bushings.

5. A bolt lock for two or more plates each of thickness materially greater than the diameter of the bolt, comprising four identical bushings each split and tapered, said bushings inserted small end foremost into the opposite ends of transverse bores in the two plates, each bore of diameter intermediate between that of the larger and the smaller end of the bushing, a bolt extending through the several bushings, a nut tightened on said bolt, the tightening of said bolt exerting a wedging action upon the several bushings to force them into the respective plates and into snug engagement about the bolt shank.

6. A screw lock for affixing a metal member to a metal support structure, said lock including a screw threaded into said support structure, a split tapered metal bushing about the shank of said screw and with its larger end toward said structure, said member having an aperture therein of diameter intermediate between those of the larger and smaller ends of said bushing and encircling said bushing, whereby in the tightening of said screw, the member is wedged over said tapered bushing for snug engagement of the latter in said aperture and for secure clasping engagement thereof about the screw shank.

7. An assembled metal structure including a pair of metal members, a pin transversely through and connecting the latter together, said pin rigid with one of said members and affording a pivot mount for the other of said members, the pin extending with small clearance through the latter of said members and extending with substantial clearance through that one of said members with respect to which it is locked, a split metal tapered bushing in said latter member filling the space therein, about the pin shank and means exerting axial tension upon the pin thereby to effect a wedging lock of the bushing to said member and said pin.

8. A pivot mount structure comprising a metal support having a tapped hole and a coaxial counter-bore, a split metal tapered bushing of diameter smaller than said counter-bore at one end and larger than said counter-bore at the other and extending with its smaller end foremost into said counter-bore, a screw through said bushing and having a shank beyond said bushing, a pivoted member having an aperture accommodating said shank, said screw in tightened position forcing said pivoted member against the larger end of said bushing and wedging the same inward to clasp the pivot pin, thereby rigidly securing the latter with respect to the structure, the screw when slightly backed off, relieving pressure upon said pivoted member to permit pivoting thereof.

9. As an article of manufacture, a hard-metal bushing longitudinally split, having a substantially cylindrical interior having its tapered exterior, continuously tapered from one end to the other and being slightly convex in longitudinal cross section at its exterior.

10. As an article of manufacture, a hard metal bushing longitudinally split, having a substantially cylindrical interior having its tapered exterior, tapered from one end to the other end thereof, the wall at the exterior being slightly concave in longitudinal section.

11. A lock-pin assembly comprising a metal mounting structure having a substantially cylindrical bore, a holding pin having a substantially cylindrical shank of diameter materially smaller than the bore, and a split, hard-metal bushing having a substantially cylindrical interior wall and an exterior wall that tapers gradually from one end of the bushing toward the opposite end of the bushing to provide a smaller thickness at the said one end than at the said opposite end, the exterior diameter at the said one end being less than the diameter of the bore and the exterior diameter at the said opposite end being greater than the diameter of the bore, whereby the said one end of the bushing is adapted to be inserted into the bore with the shank of the pin embraced by the said interior wall and whereby the pin and the bushing are thereafter adapted to be driven into the bore, the said other end being unflanged and the thickness of the said other end being small enough to permit the said other end to be driven into the bore, whereby the portion of the bushing near the said other end will be caused substantially to fill the gap between the wall of the bore and the said shank with a wedged locking fit with the exterior wall of the bushing exerting expansive force upon the wall of the bore and the interior wall of the bushing exerting clasping force upon the said shank.

12. A lock-pin assembly comprising a pair of metal plates having alined, substantially cylindrical bores, a holding pin extending through the bores having a substantially cylindrical shank of diameter materially smaller than the bores, and two split, hard-metal bushings, one for each bore, each having a substantially cylindrical interior wall and an exterior wall that tapers gradually from one end of the bushing toward the opposite end of the bushing to provide a smaller thickness at the said one end than at the said opposite end, the exterior diameter at the said one end being less than the diameter of the corresponding bore and the exterior diameter at the said opposite end being greater than the diameter of the corresponding bore, whereby the said one end of each bushing is adapted to be inserted into the corresponding bore with the shank of the pin embraced by the said interior walls of both bushings and whereby the pin and the bushings are thereafter adapted to be driven into the bores, whereby the bushings will become wedged into the bores and about the shank of the pin with the exterior walls of the bushings exerting expansive force upon the walls of the bores and the interior walls of the bushings exerting clasping force upon the said shank.

13. A bolt-lock pin assembly comprising a pair of metal plates having alined, substantially cylindrical bores, a bolt extending through the bores having a substantially cylindrical shank of diameter materially smaller than the bores, and two split, hard-metal bushings one for each bore, each having a substantially cylindrical interior wall and an exterior wall that tapers gradually from one end of the bushing toward the opposite end of the bushing to provide a smaller thickness at the said one end than at the said opposite end, the exterior diameter at the said one end being less than the diameter of the corresponding bore and the exterior diameter at the said opposite end being greater than the diameter of the corresponding bore, whereby the said one end of each bushing is adapted to be inserted into the corresponding bore with the shank of the bolt embraced by the said interior walls of both bushings and whereby the bolt and the bushings are thereafter adapted to be driven into the bores, the thickness of the said other ends of the bushings being small enough to permit the said other ends of the bushings to be driven into the bores, whereby the portions of the bushings near the said other ends will be caused substantially to fill the gaps between the walls of the bores and the said shank with a wedged locking fit with the exterior walls of the bushings exerting expansive force upon the walls of the bores and the interior walls of the bushings exerting clasping force upon the said shank, the nut upon said bolt in exerting pressure to draw the two plates together effecting the wedging lock between the plates and the bushings for tightly gripping the shank of the bolt.

BERNHARD THAL.